March 16, 1948. V. R. BECKER 2,437,927

VALVE STEM FACING FIXTURE

Filed Aug. 8, 1946

Vernie R. Becker INVENTOR.

BY Victor J. Evans & Co.

ATTORNEYS

Patented Mar. 16, 1948

2,437,927

UNITED STATES PATENT OFFICE 2,437,927

VALVE STEM FACING FIXTURE

Vernie R. Becker, Port Huron, Mich.

Application August 8, 1946, Serial No. 689,303

1 Claim. (Cl. 51—217)

This invention appertains to a valve stem facing fixture and has for an object to provide one that is simple in design, inexpensive to manufacture, and highly efficient in use, it being in the nature of a chuck to support a valve in position relatively to the abrasive wheel of a bench grinder to facilitate the grinding thereof, with the advantage of steadying the valve during the imparting of the necessary rotative movement thereto to assure of accuracy and perfection in facing formation.

With this and other objects and advantages in view, the invention resides in the certain new and useful combination, construction, and arrangement of parts, as will be hereinafter more fully described, set forth in the appended claim, and illustrated in the accompanying drawings, wherein:

Figure 1:
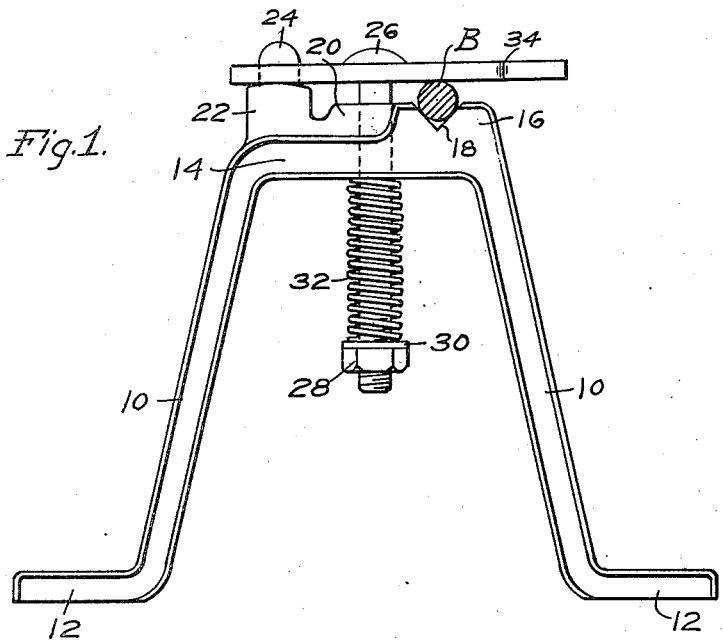
Figure 1 is a side elevation of a practical embodiment of my fixture.
Figure 2:
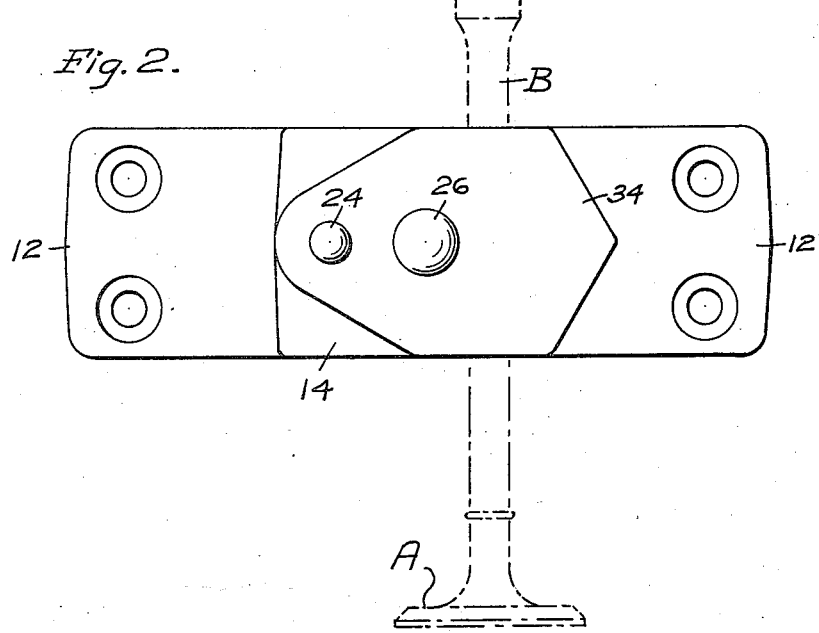
Figure 2 is a top plan view thereof.

Referring to the drawings in detail, my fixture, as it is exemplified therein, is comprised in a body or standard, which is preferably made of cast iron and of U-form, inverted to have the free ends of its side portions, or legs, 10, out-turned to provide apertured footings 12 for its securement by means of bolts or the like (not shown), on a supporting surface, such as a work-bench or the like (not shown), in parallel relation with respect to a working surface of the abrasive wheel of a bench-grinder (not shown).

The top portion 14, of the body or standard, is horizontally disposed and has an end portion upwardly thickened, as at 16, for its full width, and provided with a substantially V-shaped groove 18, extending transversely of its top side, to form a seat for the stem B, of a valve A. The top portion 14 is further thickened in an upward direction for the remainder of its length and medially with respect to its opposite sides, with an inner portion 20 of a height substantially equal to that of the portion 16, and an outer portion 22 made somewhat higher, the upper end of the latter being rounded and reduced to form a stud 24, the purpose of which will presently be explained.

The inner portion 20 is vertically apertured at its center to receive a bolt 26, with the headed end thereof uppermost, and a nut 28 screw-threaded on its lower end, with a washer 30 superimposed thereon. Positioned on the bolt 26, between the under side of the horizontal portion 14, of the body or standard, is a coil spring 32; the tension of which is to be varied, as required, by an adjustment of the nut 28.

In order to retain the valve stem B in the groove 18, a clamp element 34, in the form of a leaf spring, is provided, and has an aperture formed adjacent one of its ends for engagement with the stud 24 and its other end overlying the end portion 16 and the groove 18 therein, and a second aperture formed slightly to the side of its transverse center, nearest the stud 24, engaged on the bolt 26, immediately beneath the headed end thereof.

In use, the fixture, as thus constructed and as before stated, will be fastened on a supporting surface adjacent the abrasive wheel of a grinder, so that, with the stem B, of the valve A, laid in the groove 18, in the manner shown in the figures of the drawings, it will be firmly held in desired grinding position by the overlying portion of the clamp element 34, the tension of the latter being adjusted from the nut 28, on the bolt 26, to allow for the required turning of the valve A relatively to the abrasive wheel.

In the makeup of the fixture, I prefer to use a "carriage" type of bolt 26, provided with the standard hexagonal nut 28 and washer 30; to make the coil spring 32 of tempered steel wire, with squared ends; and the clamp element 34 of cold rolled steel, preferably cyanide or its equivalent.

Having thus fully described a preferred embodiment of my fixture, it is to be understood that the words which I have used are words of description rather than of limitation, and that changes within the purview of the appended claim may be made, without departing from the true scope and spirit of my invention in its broader aspects.

What I claim is:

A work holder comprising a flat bridge, a pair of legs connected to opposed ends of said flat bridge and diverging therefrom, said legs being adapted to be attached to a work bench, a V-shaped groove extending transversely on said bridge, a lug extending upwardly from said bridge and above the V-shaped groove, a reduced portion projecting from said lug whereby a shoulder is formed between said lug and said reduced portion, a leaf spring blade seated on said shoulder and having an opening, said reduced portion fitting withing said opening thereby retaining said blade on said shoulder, said blade overlying said V-shaped groove, and tension means for forcing said blade toward said V-shaped groove for gripping a work piece therebetween, said means including a tension bolt through said blade and bridge and extending into the space between said legs, a nut adjustably threaded on said bolt, and a coil spring about said bolt and extending between said bridge and nut whereby said nut adjusts the compression of said spring.

VERNIE R. BECKER.

REFERENCES CITED

The following references are of record in the file of this patent:

UNITED STATES PATENTS

| Number | Name | Date |
|---|---|---|
| 230,157 | Sutherland | July 20, 1880 |
| 2,114,757 | Yerkes | Apr. 19, 1938 |
| 2,365,385 | Booth | Dec. 19, 1944 |

FOREIGN PATENTS

| Number | Country | Date |
|---|---|---|
| 517,290 | France | Dec. 17, 1920 |
| 642,615 | Germany | Nov. 8, 1934 |
| 673,304 | Germany | Feb. 4, 1937 |